(12) United States Patent
Collins et al.

(10) Patent No.: US 12,442,185 B2
(45) Date of Patent: Oct. 14, 2025

(54) MULTI-STORY BUILDING HAVING PODIUM LEVEL STEEL TRANSFER STRUCTURE

(71) Applicant: Innovative Building Technologies, LLC, Seattle, WA (US)

(72) Inventors: Arlan E. Collins, Seattle, WA (US);
Mark L. Woerman, Seattle, WA (US);
Mark D'Amato, Seattle, WA (US);
Eric P. Hinckley, Superior, CO (US);
Calder Danz, Seattle, WA (US);
Christopher J. Allen, Aloha, OR (US);
Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 268 days.

(21) Appl. No.: 18/249,365

(22) PCT Filed: Oct. 21, 2021

(86) PCT No.: PCT/US2021/056074
§ 371 (c)(1),
(2) Date: Apr. 17, 2023

(87) PCT Pub. No.: WO2022/087280
PCT Pub. Date: Apr. 28, 2022

(65) Prior Publication Data
US 2023/0383521 A1  Nov. 30, 2023

Related U.S. Application Data

(60) Provisional application No. 63/178,515, filed on Apr. 22, 2021, provisional application No. 63/104,239, filed on Oct. 22, 2020.

(51) Int. Cl.
*E04B 5/04* (2006.01)
*B66B 11/00* (2006.01)
(Continued)

(52) U.S. Cl.
CPC ............ *E04B 5/04* (2013.01); *B66B 11/0005* (2013.01); *B66B 19/00* (2013.01); *E04B 1/02* (2013.01);
(Continued)

(58) Field of Classification Search
CPC ..... E04B 5/04; E04B 1/02; E04B 1/08; E04B 1/24; E04B 1/2403; E04B 1/3483;
(Continued)

(56) References Cited

U.S. PATENT DOCUMENTS 2,106,084 A * 1/1938 Coddington .............. E04C 3/08
52/655.1
3,012,639 A * 12/1961 Pavlecka .................. E04B 5/10
52/275
(Continued)

FOREIGN PATENT DOCUMENTS

EP 0843053 5/1998
EP 1683923 7/2006

OTHER PUBLICATIONS

USPTO, Written Opinion for International Patent Application No. PCT/US2021/056074, Jan. 18, 2022, 6 pages.
(Continued)

*Primary Examiner* — Rodney Mintz
(74) *Attorney, Agent, or Firm* — IP Spring

(57) ABSTRACT

A building includes a podium level steel transfer structure configured to receive vertical loads and lateral loads from upper portions of the building. The building may be a low-rise building or a mid-rise building. The podium level steel transfer structure may be at least partially pre-constructed such that final assembly may occur at a job site with reduced skilled labor. Transverse members of the podium level steel transfer structure may include engagement features extending vertically therefrom, and configured to align,
(Continued)

engage, and retain at least one interior demising wall and at least one exterior wall in an orthogonal relationship through multiple fasteners. The engagement features may include a steel member with a trapezoidal profile having one or more angular notches, one or more captive fasteners, and at least one alignment hole.

19 Claims, 18 Drawing Sheets

(51) Int. Cl.
| | |
|---|---|
| *B66B 19/00* | (2006.01) |
| *E04B 1/02* | (2006.01) |
| *E04B 1/08* | (2006.01) |
| *E04B 1/24* | (2006.01) |
| *E04B 1/348* | (2006.01) |
| *E04B 1/61* | (2006.01) |
| *E04B 2/60* | (2006.01) |
| *E04B 5/02* | (2006.01) |
| *E04B 5/10* | (2006.01) |
| *E04B 9/00* | (2006.01) |
| *E04B 9/04* | (2006.01) |

(52) U.S. Cl.
CPC ............... *E04B 1/08* (2013.01); *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search
CPC .... E04B 1/34869; E04B 1/612; E04B 1/6125; E04B 2/60; E04B 5/10; E04B 9/008; E04B 9/04; E04B 5/02; E04B 2001/2415; E04B 2001/2418; E04B 2001/2451; E04B 2001/2481; E04B 2001/6191; E04B 2001/6195; E04B 2103/06; E04H 1/04
See application file for complete search history.

(56) References Cited

U.S. PATENT DOCUMENTS

| | | | | |
|---|---|---|---|---|
| 3,849,012 | A * | 11/1974 | Krouse | E04B 1/2403 |
| | | | | 403/353 |
| 8,745,954 | B2 * | 6/2014 | Simmons | E04B 1/2403 |
| | | | | 403/231 |
| 8,973,333 | B2 * | 3/2015 | Sugihara | E04B 1/2403 |
| | | | | 52/712 |
| 8,978,324 | B2 * | 3/2015 | Collins | E04C 2/521 |
| | | | | 52/404.1 |
| 9,670,669 | B2 * | 6/2017 | Gosling | E04C 2/288 |
| 10,316,509 | B2 * | 6/2019 | Jackson | E04B 1/2403 |
| 10,364,572 | B2 * | 7/2019 | Collins | E04C 2/34 |
| 10,584,484 | B2 * | 3/2020 | Cohen | E04B 1/1909 |
| 10,858,820 | B2 * | 12/2020 | Navon | E04B 7/045 |
| 11,174,630 | B2 * | 11/2021 | Bowron | E04B 1/2604 |
| 11,371,242 | B2 * | 6/2022 | May | E04B 1/02 |
| 11,585,091 | B2 * | 2/2023 | May | E04B 1/08 |
| 12,110,682 | B2 * | 10/2024 | Russo | E04B 1/0007 |
| 12,286,785 | B2 * | 4/2025 | Collins | B66B 19/00 |
| 2004/0200178 | A1 * | 10/2004 | Simmons | E04B 1/24 |
| | | | | 52/633 |
| 2011/0296778 | A1 * | 12/2011 | Collins | E04C 2/521 |
| | | | | 52/745.1 |
| 2012/0110947 | A1 | 5/2012 | Simmons | |
| 2014/0069035 | A1 * | 3/2014 | Collins | E04B 2/72 |
| | | | | 52/745.1 |
| 2014/0130441 | A1 * | 5/2014 | Sugihara | E04B 1/2403 |
| | | | | 52/656.9 |
| 2017/0284095 | A1 * | 10/2017 | Collins | E04C 2/322 |
| 2018/0135295 | A1 | 5/2018 | Bowron | |
| 2018/0291613 | A1 | 10/2018 | Jackson et al. | |
| 2020/0056365 | A1 * | 2/2020 | Navon | E04C 3/40 |
| 2021/0246652 | A1 * | 8/2021 | May | H02G 3/04 |
| 2021/0404183 | A1 * | 12/2021 | May | E04B 2/58 |
| 2023/0094441 | A1 * | 3/2023 | Russo | E04B 1/0007 |
| | | | | 52/292 |
| 2023/0374776 | A1 * | 11/2023 | Shachrur | E04B 1/6116 |
| 2023/0374781 | A1 * | 11/2023 | Collins | E04B 1/3483 |
| 2023/0383515 | A1 * | 11/2023 | Collins | E04B 5/10 |
| 2023/0383523 | A1 * | 11/2023 | Collins | E04B 1/02 |
| 2023/0383526 | A1 * | 11/2023 | Collins | E04H 1/04 |
| 2023/0417046 | A1 * | 12/2023 | Collins | E04B 2/60 |
| 2023/0417049 | A1 * | 12/2023 | Collins | E04B 9/04 |
| 2024/0026676 | A1 * | 1/2024 | Collins | E04B 1/34869 |
| 2024/0318428 | A1 * | 9/2024 | Al-Haboobi | E04C 3/32 |

OTHER PUBLICATIONS

USPTO, International Search Report for International Patent Application No. PCT/US2021/056074, Jan. 18, 2022, 2 pages.

* cited by examiner

MULTI-STORY BUILDING HAVING PODIUM LEVEL STEEL TRANSFER STRUCTURE

CROSS-REFERENCE TO RELATED APPLICATIONS

The present application is the U.S. national phase filing under 35 U.S.C. § 371 of International Patent Application No. PCT/US2021/056074, filed Oct. 21, 2021, which claims priority under 35 U.S.C. § 119 (e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The entire contents of U.S. Provisional Patent Application Nos. 63/104,239 and 63/178,515 are hereby incorporated by reference herein.

The present application is related in subject matter to each of the following applications, each of which shares a common filing date of Oct. 21, 2021, entitled "MULTI-STORY BUILDING HAVING LOAD BEARING WALLS AND METHOD TO CONSTRUCT THE BUILDING", "PRE-MANUFACTURED LOAD BEARING WALLS FOR A MULTI-STORY BUILDING", "PRE-MANUFACTURED FLOOR-CEILING PANEL FOR A MULTI-STORY BUILDING HAVING LOAD BEARING WALLS", "PRE-MANUFACTURED UTILITY WALL FOR A MULTI-STORY BUILDING HAVING LOAD BEARING WALLS", "PRE-MANUFACTURED FLOOR-CEILING CORRIDOR PANEL FOR A MULTI-STORY BUILDING HAVING LOAD BEARING WALLS", "MULTI-STORY BUILDING HAVING PREFABRICATED STAIR AND ELEVATOR MODULES", and "PRE-MANUFACTURED FLOOR-CEILING DRAG ANCHOR FOR A MULTI-STORY BUILDING HAVING LOAD BEARING WALLS", all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time-to-build, providing building designs that efficiently use space, and other challenges brought on by increasing demands for affordable housing and other building needs.

SUMMARY

Implementations of this application relate to a podium level steel transfer structure that may be used in construction of a building or edifice. Various aspects are disclosed herein.

In one aspect, a podium level steel transfer structure for a building is disclosed. The podium level steel transfer structure can comprise: a vertical member configured to extend vertically from a ground plane, the vertical member being substantially rectangular in cross section, the vertical member having a first end configured to be joined to a foundation laid on the ground plane and a second end configured to receive and transfer loads and forces of the building to the foundation; a longitudinal member configured to extend orthogonal to the vertical member and parallel to the ground plane, the longitudinal member having a two end plates arranged on respective ends of the longitudinal member, each of the two end plates being configured to join at the second end of the vertical member; and a transverse member configured to extend orthogonal to the vertical member, orthogonal to the longitudinal member, and parallel to the ground plane, the transverse member comprising a first distal end having a first engagement feature configured to align, engage, and retain an interior load-bearing wall panel, the first distal end configured to rest upon the second end of the vertical member, the transverse member further comprising a second distal end having a second engagement feature configured to align, engage, and retain the interior load-bearing wall panel, the second distal end configured to rest upon the second end of the vertical member.

In some implementations, the vertical member, longitudinal member, and transverse member are formed from metal.

In some implementations, the second end of the vertical member comprises at least three end plates welded thereon, wherein each end plate of the at least three end plates comprises one or more captive fasteners arranged to receive and retain fasteners engaged with one or more of the longitudinal member or the transverse member.

In some implementations, each end plate of the at least three end plates is configured to receive and retain fasteners inserted through respective end plates of the longitudinal member and the transverse member.

In some implementations, the second end of the vertical member comprises an end plate welded thereon and configured to support the first distal end or the second distal end of the transverse member.

In some implementations, the vertical member is formed from structural steel having a rectangular cross section, and wherein a thickness of sides of the rectangular cross section are dimensioned to receive and support transferred loads from upper levels of the building.

In some implementations, the longitudinal member is formed from a steel I-beam or two or more steel channels welded to one another.

In some implementations, each of the two end plates of the longitudinal member are welded onto respective ends of the longitudinal member.

In some implementations, the transverse member is formed from a steel I-beam or two or more steel channels welded to one another.

In some implementations, the first distal end of the transverse member comprises an end cap extending along an axis defined by the transverse member and configured to rest on top of the second end of the vertical member, wherein the first distal end further comprises an end plate welded between the end cap and a main body of the transverse member, and wherein the end plate comprises one or more through holes configured to receive fasteners that engage with the second end of the vertical member.

In some implementations, wherein the first engagement feature extends into the end cap and is welded onto and within the end cap.

In some implementations, the first engagement feature comprises at least one oblique notch configured to engage with the interior load-bearing wall panel.

In some implementations, the second distal end of the transverse member comprises an end cap extending along an axis defined by the transverse member and configured to rest on top of the second end of the vertical member, wherein the second distal end further comprises an end plate welded between the end cap and a main body of the transverse member, and wherein the end plate comprises one or more through holes configured to receive fasteners that engage with the second end of the vertical member.

In some implementations, the second engagement feature extends across the end cap and is welded onto the end cap to form another end plate.

In some implementations, the second engagement feature comprises at least one oblique notch configured to engage with the interior load-bearing wall panel.

In some implementations, the longitudinal member further comprises a central portion arranged to support and engage with both of the first distal end and the second distal end of the transverse member.

According to another aspect, a building is disclosed. The building can comprise: one or more levels formed from prefabricated interior and exterior panels and substantially parallel to a ground plane defined by a foundation; and a podium level steel transfer structure arranged to receive and support loads from the one or more levels and transfer the loads to the foundation, the podium level steel transfer structure comprising: a vertical member being substantially rectangular in cross section, the vertical member having a first end configured to be joined to the foundation and a second end configured to receive and transfer the loads; a longitudinal member extending orthogonal to the vertical member and parallel to the ground plane, the longitudinal member having a two end plates arranged on respective ends of the longitudinal member, at least one of the two end plates being joined at the second end of the vertical member; and a transverse member extending orthogonal to the vertical member, orthogonal to the longitudinal member, and parallel to the ground plane, the transverse member comprising a first distal end having a first engagement feature configured to align, engage, and retain an interior load-bearing wall panel of at least one of the one or more levels, the first distal end configured to rest upon the second end of the vertical member, the transverse member further comprising a second distal end having a second engagement feature configured to align, engage, and retain the interior load-bearing wall panel, the second distal end configured to rest upon the second end of the vertical member.

In some implementations, the second end of the vertical member comprises at least three end plates welded thereon, wherein each end plate of the at least three end plates comprises one or more captive fasteners, and wherein each end plate of the at least three end plates is configured to receive and retain fasteners inserted through respective end plates of the longitudinal member and the transverse member.

In some implementations, the longitudinal member is formed from a steel I-beam or two or more steel channels welded to one another, and wherein each of the two end plates of the longitudinal member are welded onto respective ends of the longitudinal member.

In some implementations: the first distal end of the transverse member comprises an end cap extending along an axis defined by the transverse member and configured to rest on top of the second end of the vertical member, wherein the first distal end further comprises an end plate welded between the end cap and a main body of the transverse member, and wherein the end plate comprises one or more through holes configured to receive fasteners that engage with the second end of the vertical member; the second distal end of the transverse member comprises an end cap extending along an axis defined by the transverse member and configured to rest on top of the second end of the vertical member, wherein the second distal end further comprises an end plate welded between the end cap and a main body of the transverse member, and wherein the end plate comprises one or more through holes configured to receive fasteners that engage with the second end of the vertical member; the first engagement feature extends into the end cap and is welded onto and within the end cap; and the second engagement feature extends across the end cap and is welded onto the end cap to form another end plate.

DETAILED DESCRIPTION

Figure 1:
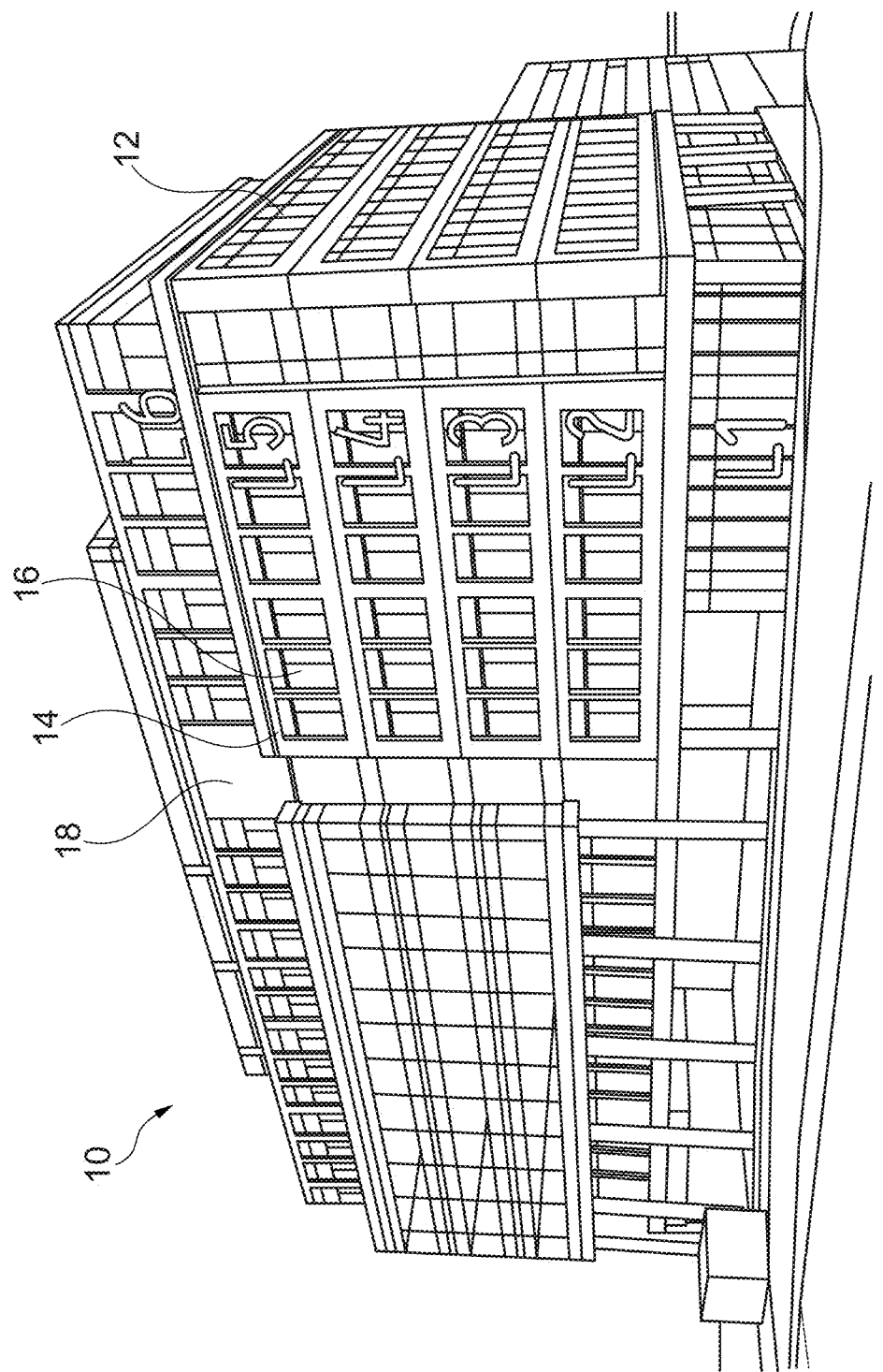
FIG. 1 is an illustration of an example multi-story building that can have load bearing walls and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

As used herein, the term "longitudinal" refers to a relative direction, generally in the direction of a major length of a component; however, longitudinal may refer to any length if the component is square. As used herein, the term "transverse" refers to a relative direction that is substantially orthogonal to a longitudinal reference direction; however, lateral may refer to any direction that crosses a longitudinal direction in some examples where oblique members are arranged proximal longitudinal members. It should be readily understood that as both terms "longitudinal" and "lateral" are relative to a frame of reference, they may be used interchangeably depending upon a particular frame of reference, depending upon a desired final placement, and/or depending upon a specific context in which the two terms are used.

This disclosure is drawn, inter alia, to methods, systems, products, devices, and/or apparatuses generally related to load bearing walls and other building parts (e.g., floor panels, stair and elevator modules, steel transfer structures, corridor panels, etc.) for a multi-story building, such as a low-rise or mid-rise building. Traditionally, buildings are constructed using a metallic (e.g., steel, aluminum, etc.) structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein provide structural components to construct a building, for example, load bearing walls and other building parts such that the reliance upon a traditional structural frame can be reduced or eliminated, while at the same time enabling the building to meet lateral and vertical loading requirements. The load bearing walls can be pre-manufactured demising walls, end walls, shear walls, or other vertical walls, at least some of which are constructed and arranged so as to provide the structural support for the building in a manner that is sufficient to enable the building to handle vertical and lateral loads. The other building parts, such as floor panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time-to-build and at a lower cost (relative to a building that is constructed using a traditional structural frame), and without sacrificing the structural integrity of the building. Moreover, the floor-ceiling panels of the building may be made thinner relative to conventional floor-ceiling panels, thereby enabling the building to have more stories per vertical foot compared to a traditional building. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composite materials, glass mat, gypsum, fiber cement, magnesium oxide, to wood and wood polymer composites (WPC), wood based products (lignin), other organic building materials (bamboo) to organic polymers (plastics), to hybrid materials, earthen materials such as ceramics, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 10 that can have a podium level steel transfer structure, load bearing walls, and other building parts (e.g., pre-manufactured floor-ceiling panels, corridor panels, utility walls, window walls, and other type of walls, etc.), in accordance with some implementations. It is noted that the building 10 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 10.

The building 10 may be a multi-story building with one or more units (e.g., living, office, or other spaces) in each story. In the example of FIG. 1, the building 10 has six stories/levels, labeled as levels L1-L6. Also as shown in FIG. 1, the building 10 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 10 has a smaller rectangular footprint relative to levels L1-L5.

The ground floor level L1 may contain living spaces, office spaces, retail spaces, storage spaces parking, storage, common areas (such as a lobby), etc. or combination thereof. Levels L2-L6 may also contain living spaces, office spaces, retail spaces, storage spaces, common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc. separated by walls, such as demising walls or utility walls. There may be multiple units (e.g., for multiple respective tenants) on each story, or only a single unit (e.g., for a single tenant) on a single story.

Each end of the building 10 includes an end wall 12. One or more panels that make up the end wall 12 may span a single story in height, or may span multiple stories (e.g., two or more stories) in height. Any of the sides of the building 10 may include a window wall 14 that accommodates a window 16, such as window(s) for unit(s). One or more panels that make up the window wall 14 may span a single story in height. Some parts of the building 10 may include an end wall without windows (e.g., not a window wall), such as an end wall 18, which may be comprised of a panel that spans one story of the building 10.

The unit(s) in each story may be formed using either an entire pre-manufactured module or from one or more pre-manufactured floor-ceiling panels and wall panels (not shown in FIG. 1), and the units may also adjoin each other via hallways having pre-manufactured corridor panels as floor panels. A floor-ceiling panel may form the floor of a first unit and a ceiling of a second unit below the first unit, and may also be used to form part of the roof of the building 10 when used as the ceiling panel for the top floor. The pre-manufactured wall panels may be used to form interior walls (e.g., demising walls, utility walls that serve as corridor walls, etc.), window walls (e.g., exterior window wall 14 that accommodate one or more windows 16), utility walls (e.g., walls with utilities such as plumbing and electrical wiring contained therein), end walls, etc. According to various embodiments, at least some of these panels may be pre-manufactured off-site, and then installed on site by coupling them together to construct the building 10. The various components of such panels and how such panels are attached to each other will be described later below.

The sides of interior walls that face the interior space (e.g., living space) of the building 10 may be covered by a finish panel, such as wall paneling, for decorative and/or functional purposes. Analogously, the sides of floor-ceiling panels that face the interior space (e.g., living space) of the building 10 may also be covered with laminate flooring, finish panels, tile, painted/textured sheetrock, etc. for decorative and/or functional purposes. For exterior walls such as end walls and window walls, the sides of these walls facing the outside environment may be covered with waterproofing membranes, tiles, glass, or other material for decorative and/or functional purposes.

According to various implementations, the building 10 is constructed using load bearing walls (such as demising walls, end walls, etc.). In this manner, such walls are able to support vertical loads, as well as lateral loads. Because these walls are load bearing components, the building 10 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 10, having six levels L1-L6, is defined in some jurisdictions as a mid-rise building (e.g., buildings having five to 12 levels). Buildings having four levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

For purposes of example and illustration, some buildings described herein will have a generally rectangular footprint, and will be assumed to be a low-rise building having at most five stories (levels), and it is understood that the various implementations described herein may be used for buildings with other numbers of stories. The features disclosed herein may be adapted to construct buildings having other shapes, sizes, heights, configurations, number of stories, etc., or any other building where load bearing walls and the other building parts described herein are used in the absence of extensive structural frames on at least some stories. In some embodiments, the various operations of a construction sequence may be performed in a different order, omitted, supplemented with other operations, modified, combined, performed in parallel, etc., relative to what is shown and described herein.

Generally, construction of mid-rise buildings may include a podium level foundation created on-site, through skilled labor including welding, riveting, and other joining, as well as through complex construction and surveying techniques. In contrast to these general construction techniques, the example preparation of construction materials described herein allows for the construction of a podium level steel transfer structure that offers similar benefits to general construction techniques, with reduced skill level required of workers, less time compared to conventional techniques, and other technical benefits that will become apparent throughout this disclosure.

As described herein, the construction of a podium level steel transfer structure is presented with reference to the many drawings, where portions of the podium level steel transfer structure are illustrated in relation to other building components. The podium level steel transfer structure is configured to receive loads from the super structure of a building and transfer the same amongst various members and a foundation. The podium level steel transfer structure comprises a steel frame that receives and transfers these loads to the foundation, such as a steel reinforced concrete foundation, or other appropriate foundation. The steel transfer structure may have columns (e.g., vertical members) having a height that spans at least one story, girders (e.g., longitudinal members) that join pairs of columns, and beams (e.g., transverse members) that perpendicularly join pairs of girders. Hereinafter, with reference to FIGS. 2-17, a podium level steel transfer structure is described in detail.

Figure 2A:
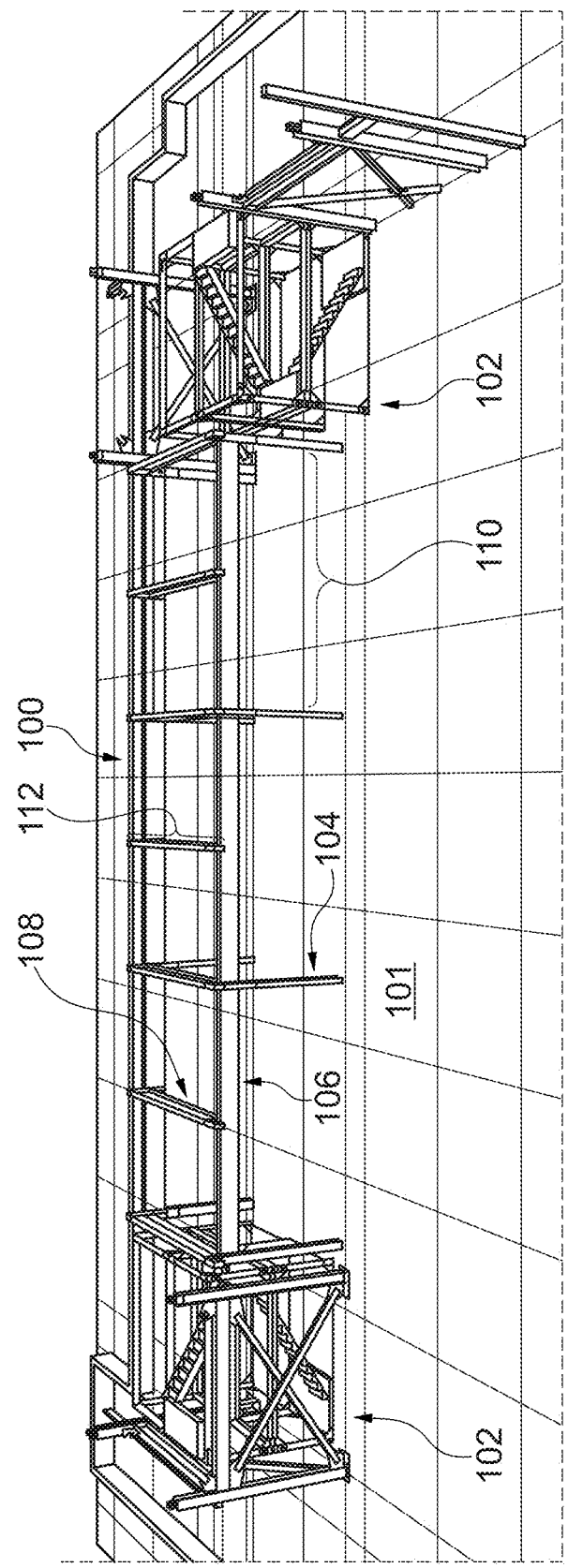
FIGS. 2A and 2B illustrate an example building podium level steel transfer structure, in accordance with some implementations.
Figure 2B:
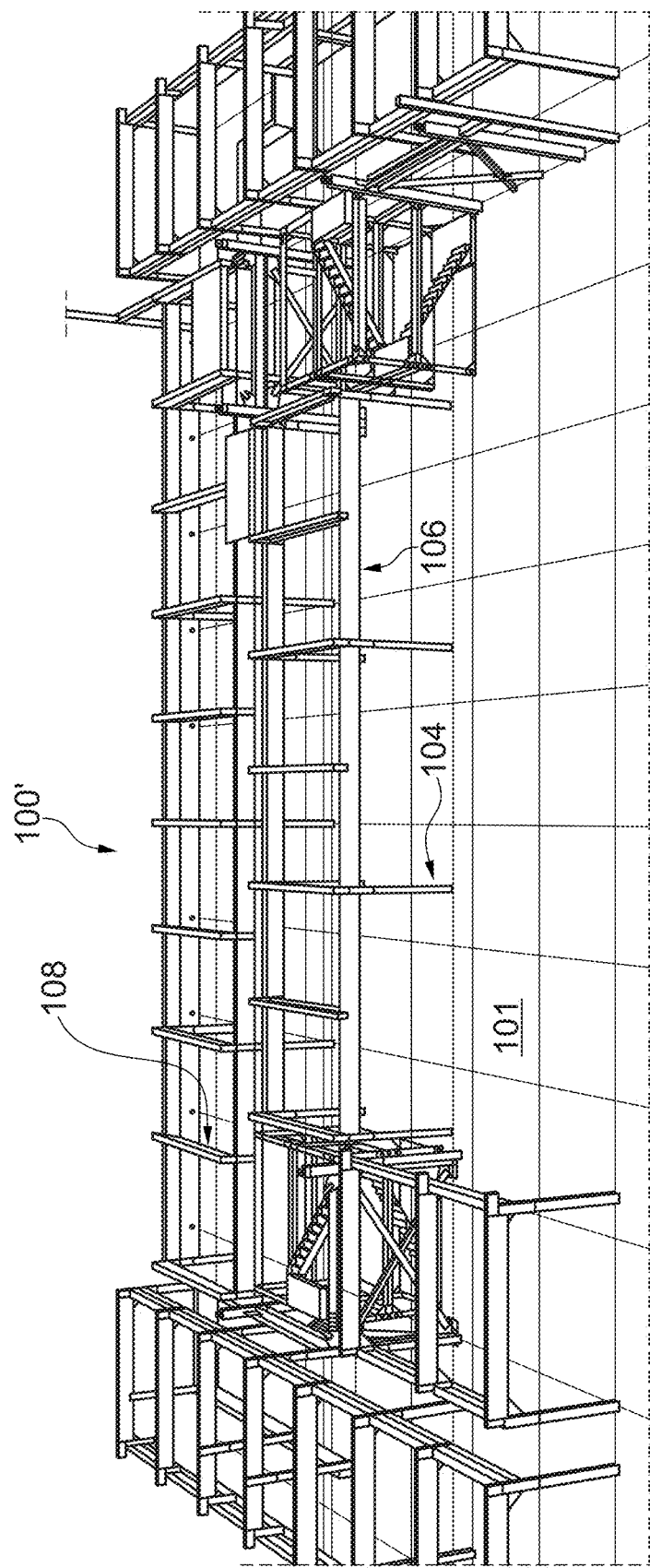

FIGS. 2A and 2B illustrate an example building podium level steel transfer structure 100, in accordance with some implementations. The podium level steel transfer structure 100 is an on-site constructed transfer structure joined to a foundation 101. For example, the foundation 101 may be formed at the job-site after surveying through any suitable manner. The foundation 101 may be a steel-reinforced concrete foundation in some implementations. The foundation 101 may define a ground plane (e.g., a reference plane) to describe the geometry of various portions of the podium level steel transfer structure 100. The foundation 101 may include serviceable utilities connections (not illustrated) and/or any other suitable connection, piping, plumbing, etc., such that upon construction, the building will be available for immediate use.

As further illustrated, the foundation 101 may include prefabricated stair or elevator modules 102 disposed thereon or therein, respectively. The prefabricated stair or elevator modules may each be laid onto the foundation 101 and joined through fasteners, welding, or any suitable attachment manner. Upon installation, the podium level steel transfer structure 100 may be installed about the stair or elevator modules and joined thereto using steel transfer braces that are at least somewhat similar to other members of the podium level steel transfer structure 100.

The podium level steel transfer structure 100 may include, at least, four vertical members 104, two longitudinal members 106, and three transverse members 108. The podium level steel transfer structure 100 can be extensible to include any number of vertical, longitudinal, and transverse members, for example, through installation of many pluralities of vertical members 104, longitudinal members 106, and transverse members 108.

Each vertical member 104 may be referred to herein as a "column," and may be formed of hollow structural steel (HSS), wide flange columns, structural steel, steel stock having a substantially straight form, and/or any suitable material for forming a supportive column of a building. Furthermore, and illustrated more clearly with reference to FIGS. 4 and 5, each vertical member 104 includes an end cap welded thereon and configured to align, engage, and retain distal ends of the longitudinal members 106 and transverse members 108.

According to at least one implementation, each vertical member 104 is a 4 inch, 6 inch, 8 inch, 10 inch, or larger square columnar member arranged vertically and extending orthogonally from the foundation 101. Other sizes are also applicable. The square HSS member may be joined to the foundation 101 through fasteners and/or anchors. The square HSS members may extend upward to a height of a single or dual story of the building 10. According to at least one implementation, the square members are aligned at about twenty-five foot intervals from a central axis of one another (e.g., spaces 110, 112), such that each subportion of the podium level steel transfer structure 100 defined by two longitudinal members and three transverse members incorporates an uninterrupted space of approximately six hundred twenty five feet minus a footprint of the included vertical members 104. According to at least one implementation, the square members are aligned at about twenty-seven foot six-inch intervals from a central axis of one another (e.g., spaces 110, 112), such that each subportion of the podium level steel transfer structure 100 defined by two longitudinal members and three transverse members incorporates an uninterrupted space of approximately seven hundred fifty six feet minus a footprint of the included vertical members 104.

This uninterrupted space may be useful and beneficial for installation of utilities, parking areas, common areas, and/or other spaces for the building 10.

Each longitudinal member 106, or girder, may be dimensioned to extend across a space 110 formed between two vertical members 104. Similarly, each transverse member 108 may be dimensioned to extend across a space 112 formed between two longitudinal members 106. Accordingly, each subportion of the podium level steel transfer structure 100 may include dimensions of space 110 by space 112. Other dimensions may be applicable in some implementations.

As shown in FIG. 2B, additional vertical members 104, longitudinal members 106, and transverse members 108 may be joined together to create a larger podium level steel transfer structure 100'. The larger podium level steel transfer structure 100' may be dimensioned to match a floor plan of the building 10, and may include all appropriate members for construction of the super structure of the building 10. For example, as floor-ceiling panels, wall panels, and brace members are engaged with the upper portion of the larger podium level steel transfer structure 100', the Level L2 of FIG. 1 is constructed. Thereafter, additional floor-ceiling panels, wall panels, and brace members are engaged with the upper portion of the prior level (e.g., Level L2) to create the subsequent level L3, and so on.

According to various embodiments, such as the arrangement shown in FIGS. 2A and 2B, columns 104 are positioned at every other beam 108. This arrangement enables more open space at ground level L1 (e.g., for lobbies, parking, offices, stores, etc.), without undue obstruction from multiple columns 104. According to one implementation, the space between consecutive beams 108 is sized to receive three adjoining floor-ceiling panels, although the size of the floor-ceiling panels and the space between consecutive beams 108 and girders 106 can vary from one implementation to another. For instance, some implementations may install multiple floor-ceiling panels between consecutive beams 108 that may vary in widths from 13 feet, to 10 feet, to 20 feet, to 24 feet, etc.

Hereinafter, a more detailed discussion of various engagement features of the podium level steel transfer structure 100 (and ostensibly any subportion thereof and/or larger structure 100') are described with reference to FIGS. 3-17. While varying components are illustrated in each figure, it should be understood that more, fewer, or alternative components may also be used where context clearly indicates substitutions or additions are appropriate.

Figure 3:
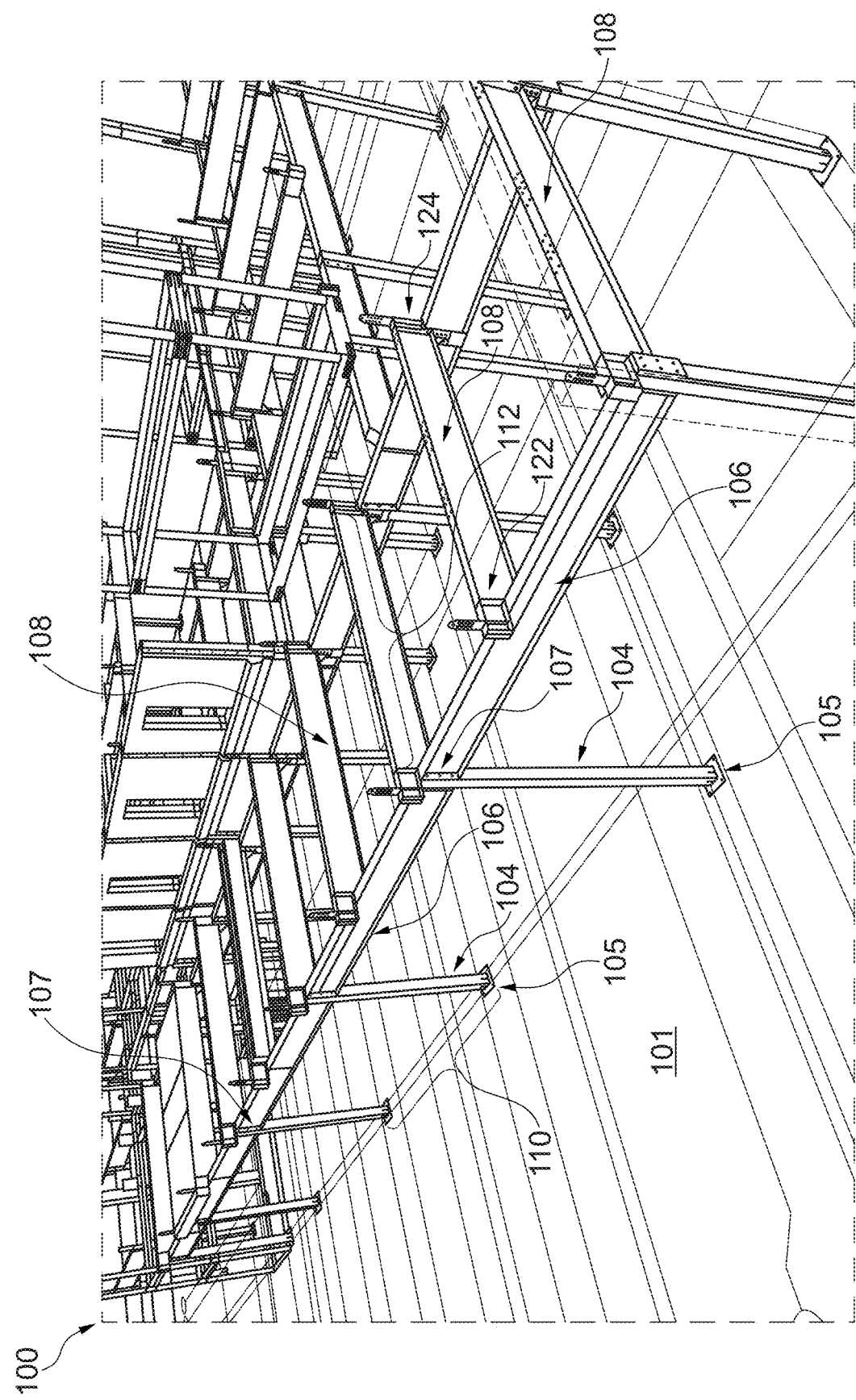
FIG. 3 is an axonometric view of a portion of a podium level steel transfer structure, in accordance with some implementations.

FIG. 3 is an axonometric view of a portion of the podium level steel transfer structure 100, in accordance with some implementations. As illustrated, the podium level steel transfer structure 100 is formed by joining vertical members 104 to the foundation 101 through fasteners driven through base plates 105. Each base plate 105 may be welded to a base on a vertical member 104. Each base plate 105 may be dimensioned slightly larger than the cross section of vertical members 104 such that fasteners may be placed about the periphery of the vertical member 104, through the base plate 105, into the foundation 101. Other types of fasteners may also be applicable.

Upon placement of at least two vertical members 104, longitudinal members 106 may be fastened between opposing vertical members 104, through base plates 107 (also may be referred to as beam end plates, and/or other similar phrasing). Each base plate 107 may be a rectangular member welded onto distal ends of the longitudinal members 106. Each base plate 107 may retain a fastener that is driven into an endcap welded onto an upper end of each vertical member 104 (illustrated in FIGS. 4 and 5). As illustrated, the longitudinal member 106 may be formed from an I-beam, wide flange, HSS, other structural member, and/or two or more channels of steel welded together.

Upon placement of an additional at least two vertical members 104 and a longitudinal member in parallel to another longitudinal member, three transverse members 108 may be arranged and fastened thereto. For example, each transverse member 108 may be fastened to either the end cap of the vertical member 104 or a central portion of each longitudinal member. In this manner, each of the end cap of the vertical member 104 and the central portion of the longitudinal member may include captive fasteners, such as welded nuts, to retain the fasteners. Furthermore, each longitudinal member 108 may include an exterior wall distal end 122 and a utility wall distal end 124. Generally, the exterior wall distal end 122 may be arranged to receive, align, and retain both an exterior wall and an interior wall. Generally, the utility wall distal end 124 may be arranged to receive, align, and retain both an exterior utility wall and an interior wall.

Figure 4:
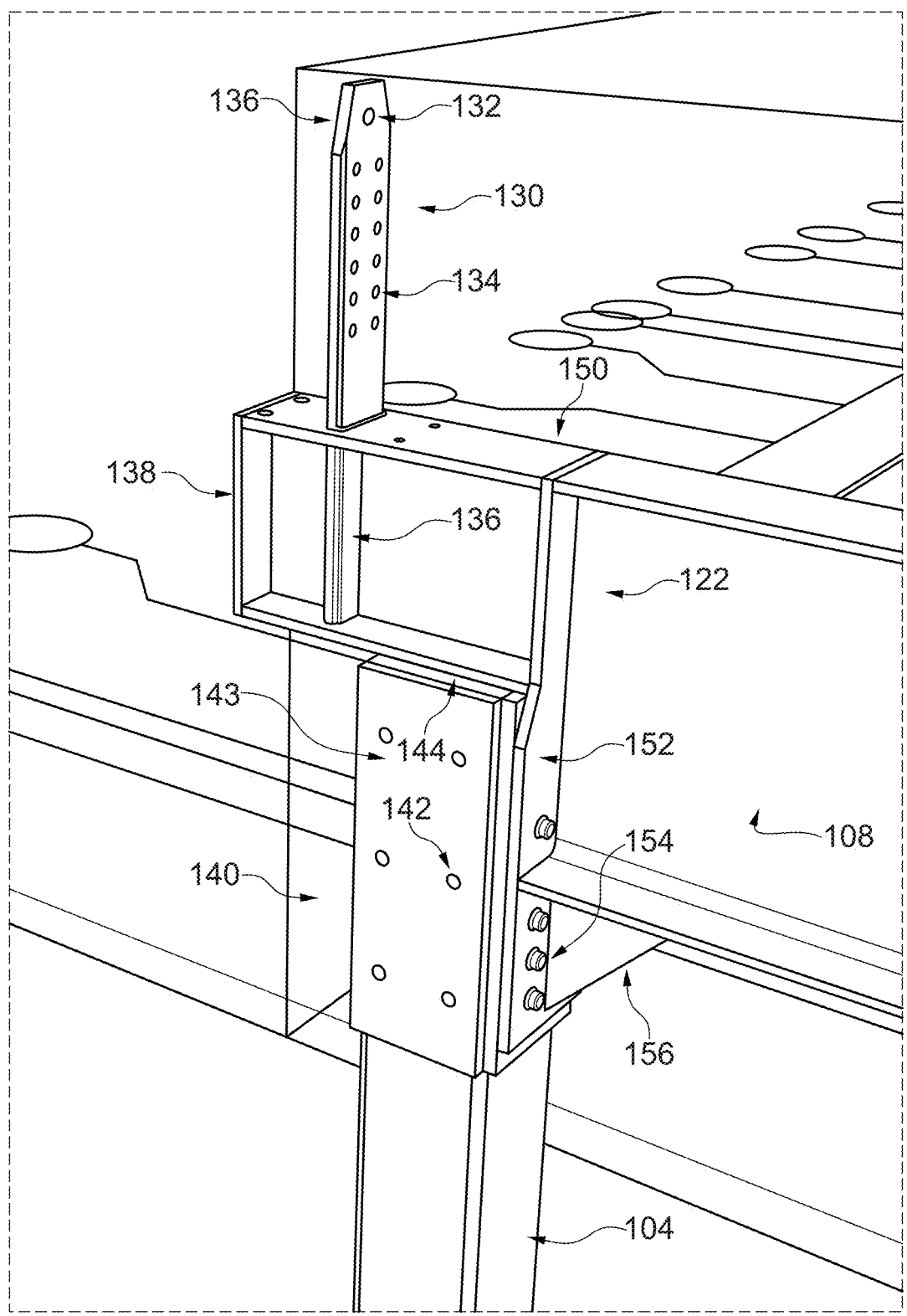
FIG. 4 is a detail view of an exterior wall distal end of a podium level steel transfer structure, in accordance with some implementations.
Figure 5:
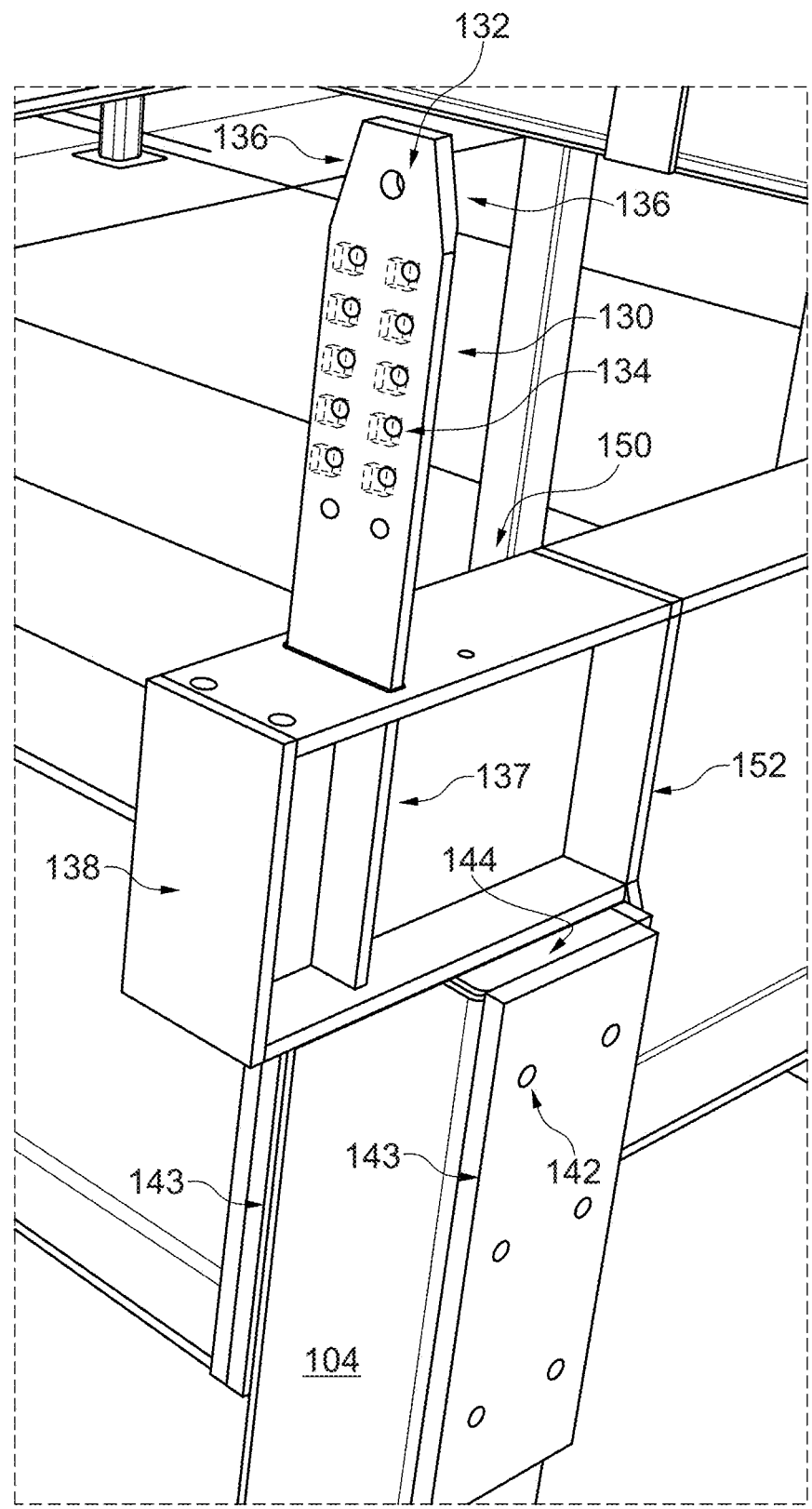
FIG. 5 is an additional detail view of an exterior wall distal end of a podium level steel transfer structure, in accordance with some implementations.

FIG. 4 is a detail view of the exterior wall distal end 122 of the podium level steel transfer structure 100, and FIG. 5 is an additional detail view of an exterior wall distal end of the podium level steel transfer structure 100, in accordance with some implementations.

As illustrated, an upper end of the vertical member 104 has an end cap 140 welded thereon. The end cap fits tightly onto the end of the vertical member 104, and may be formed with three individual end plates 143 welded to one another and to an upper plate 144, or by any other suitable manner. The end cap may also be formed as a welded assembly of plates, a one-piece casting, and/or any suitable manner of end cap. The exterior wall distal end 122 rests upon the upper plate 144 of the end cap 140. Additionally, captive fasteners 142 are arranged on the end plates 143 such that fasteners may be easily driven and members may be joined to one another as illustrated.

Figure 8:
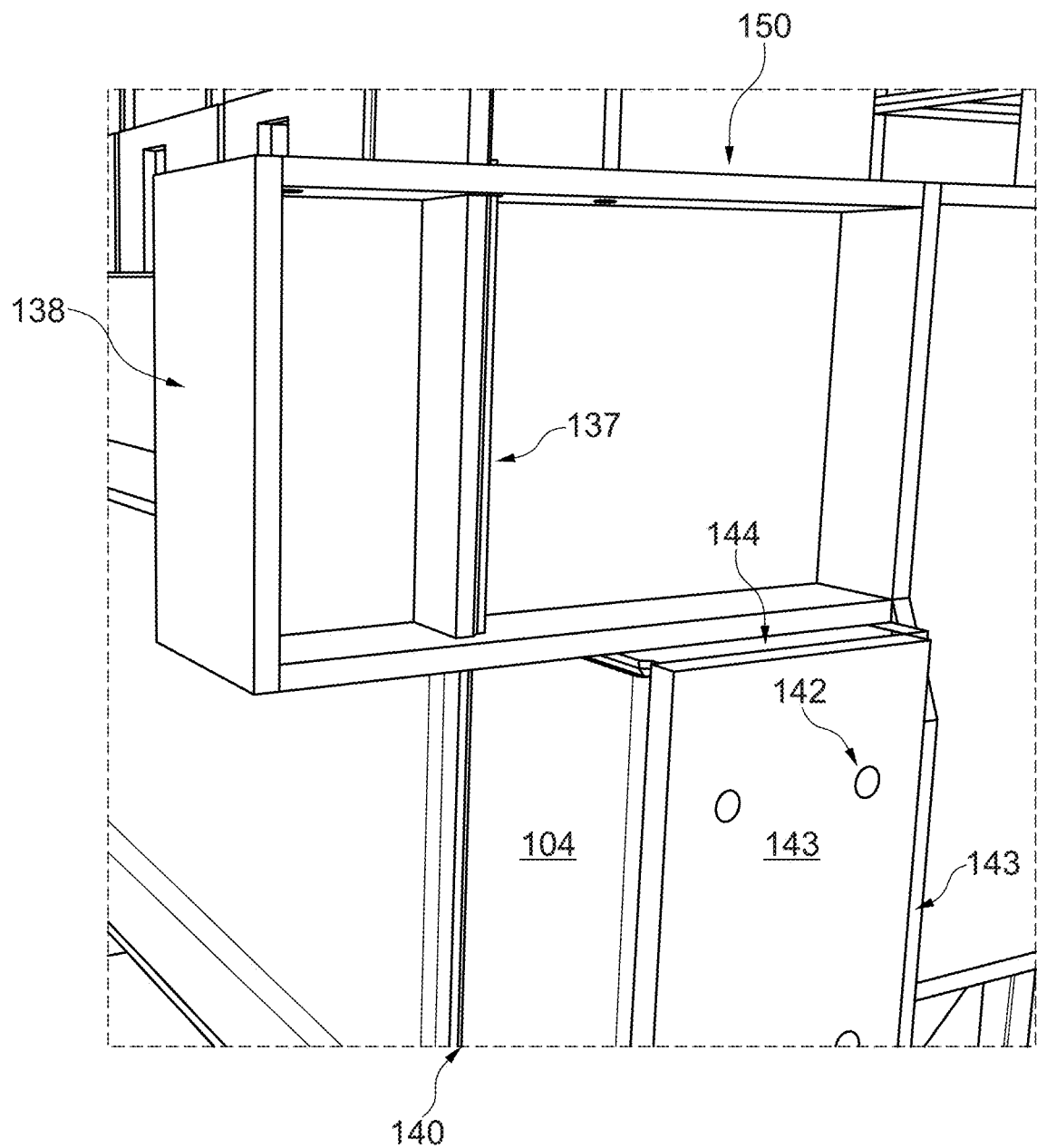
FIG. 8 is a detail view of a column of a podium level steel transfer structure, in accordance with some implementations.

For example, turning to FIG. 8, a more detailed view of a column 104 of the podium level steel transfer structure 100 is shown. As illustrated, upper end of the vertical member 104 has an end cap 140 welded thereon. The end cap fits tightly onto the end of the vertical member 104, and may be formed with three individual end plates 143 welded to one another and to an upper plate 144, or by any other suitable manner.

Turning back to FIG. 4 and FIG. 5, the exterior wall distal end 122 includes an end plate 152 welded thereon, fasteners 154 arranged to fasten the endplate 152 to the end cap 140, an oblique support member 156 welded thereon, and an end cap 150 welded to the end plate 152. As illustrated, the transverse member 108 may be formed from an I-beam, wide flange, HSS, other structural member, and/or two or more channels of steel welded together.

The end cap 150 may include an end plate 138 welded thereon. Furthermore, the end cap 150 may include engagement feature 130 welded thereon and protruding therein (see protruding end 137 within interior portion of the end cap 150). The engagement feature 130 is a generally trapezoidal plate of steel welded onto and within the end cap 150. The engagement feature 130 may extend vertically at an orthogonal angle to a central axis formed by the transverse member 108. The engagement feature 130 may have two major sides with through/alignment hole 132 formed there-through, as well as captive fasteners 134 welded thereon. The engagement feature 130 may include two or more notches 136 formed at a distal, upper end configured to receive, align, and retain both an interior wall and an exterior wall during building construction. The term "notches" may also refer to chamfers, oblique cuts, or other terminology.

Figure 6:
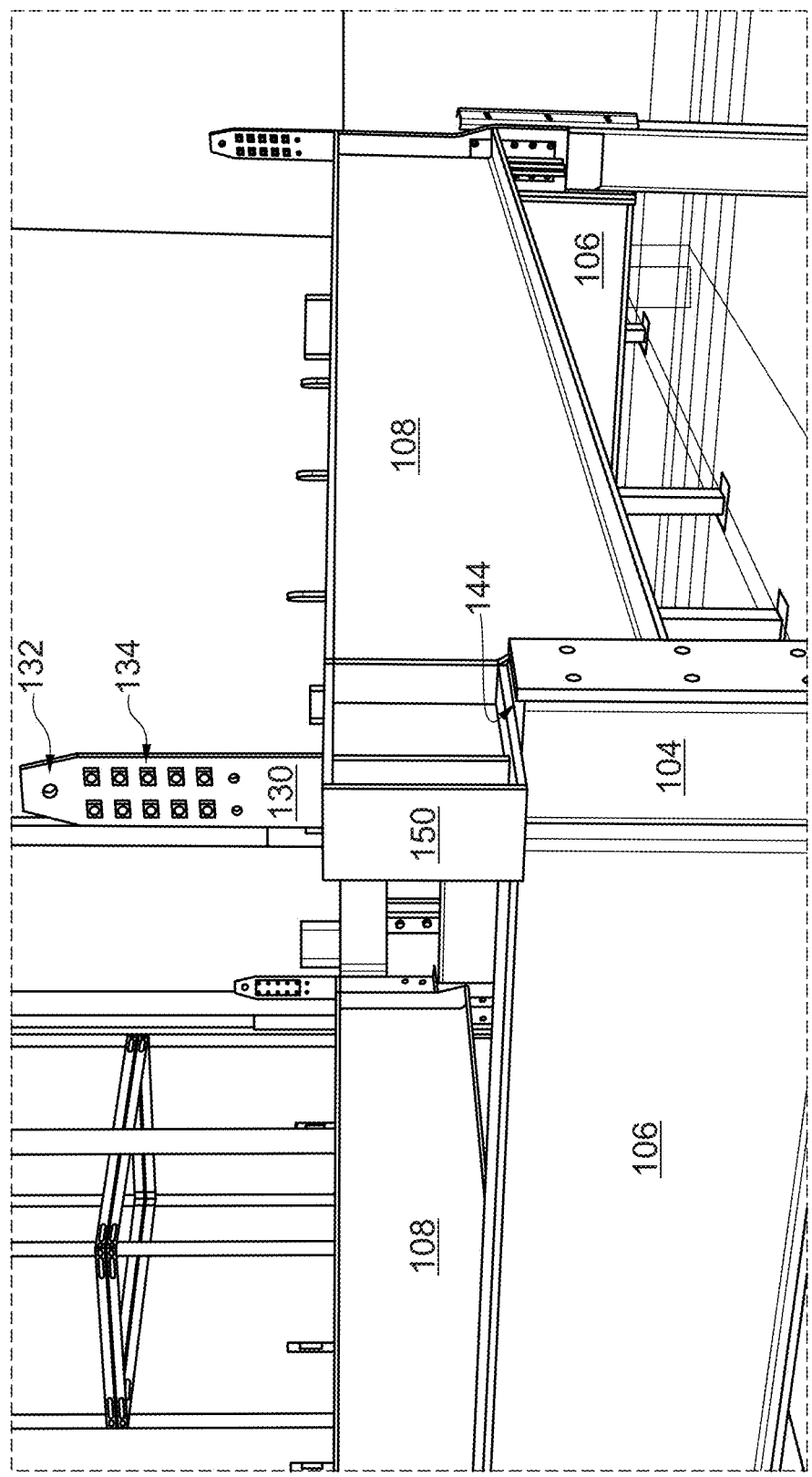
FIG. 6 is an axonometric view of an exterior wall distal end of a podium level steel transfer structure, in accordance with some implementations.

FIG. 6 is an axonometric view of the exterior wall distal end 122 of the podium level steel transfer structure 100, in accordance with some implementations. As illustrated, each transverse member 108 forms an orthogonal angle with each longitudinal member 106. Furthermore, at least two transverse members 108 of each subportion of the structure 100 are substantially coplanar with associated two vertical members 104. Similarly, each longitudinal member 106 is substantially coplanar with associated two vertical members 104. Accordingly, each subportion of the structure 100 is a generally rectangular subportion having at least four vertical members 104 associated therewith, two longitudinal members 106 associated therewith, and three transverse members associated therewith. Each transverse member 108 includes engagement features 130 extending vertically. For example, the engagement features are orthogonal to a plane formed by upper surfaces of the transverse members 108. Finally, as shown, each exterior wall distal end includes an end cap 150 arranged on an upper end plate 144 of each vertical member 104.

Figure 7:
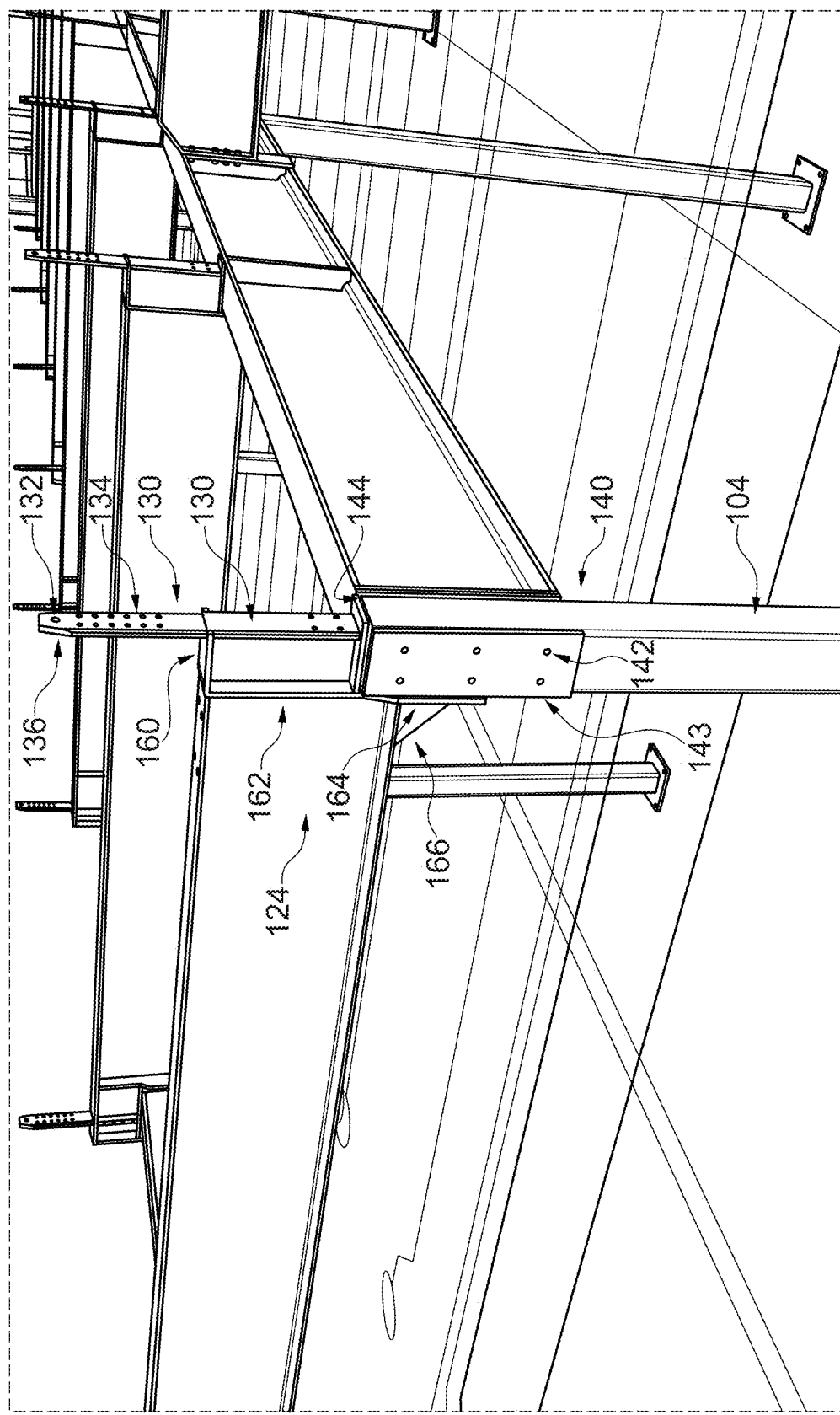
FIG. 7 is an axonometric view of a utility wall distal end of a podium level steel transfer structure, in accordance with some implementations.
Figure 9:
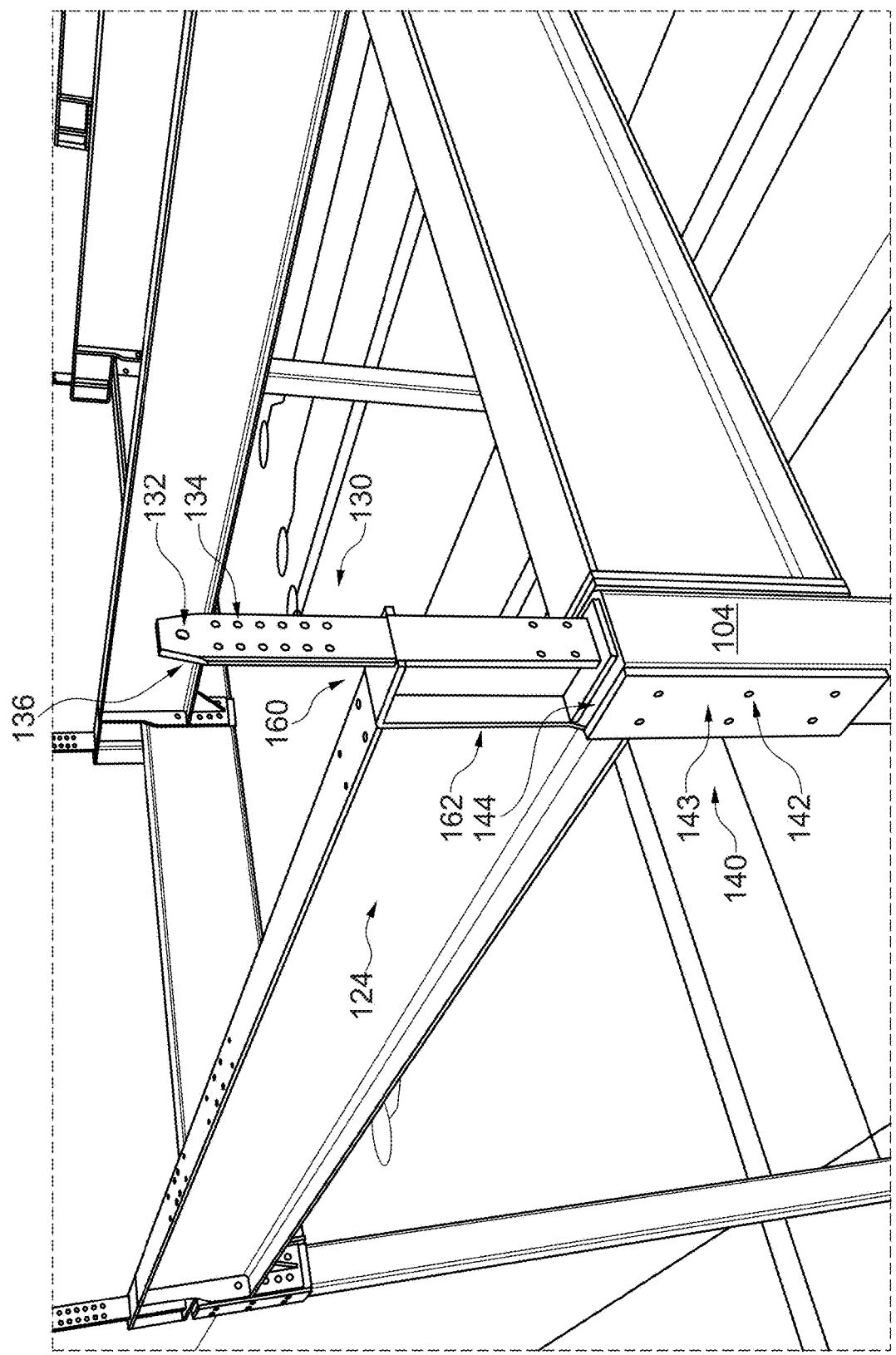
FIG. 9 is a detail view of a utility wall distal end of a podium level steel transfer structure, in accordance with some implementations.
Figure 10:
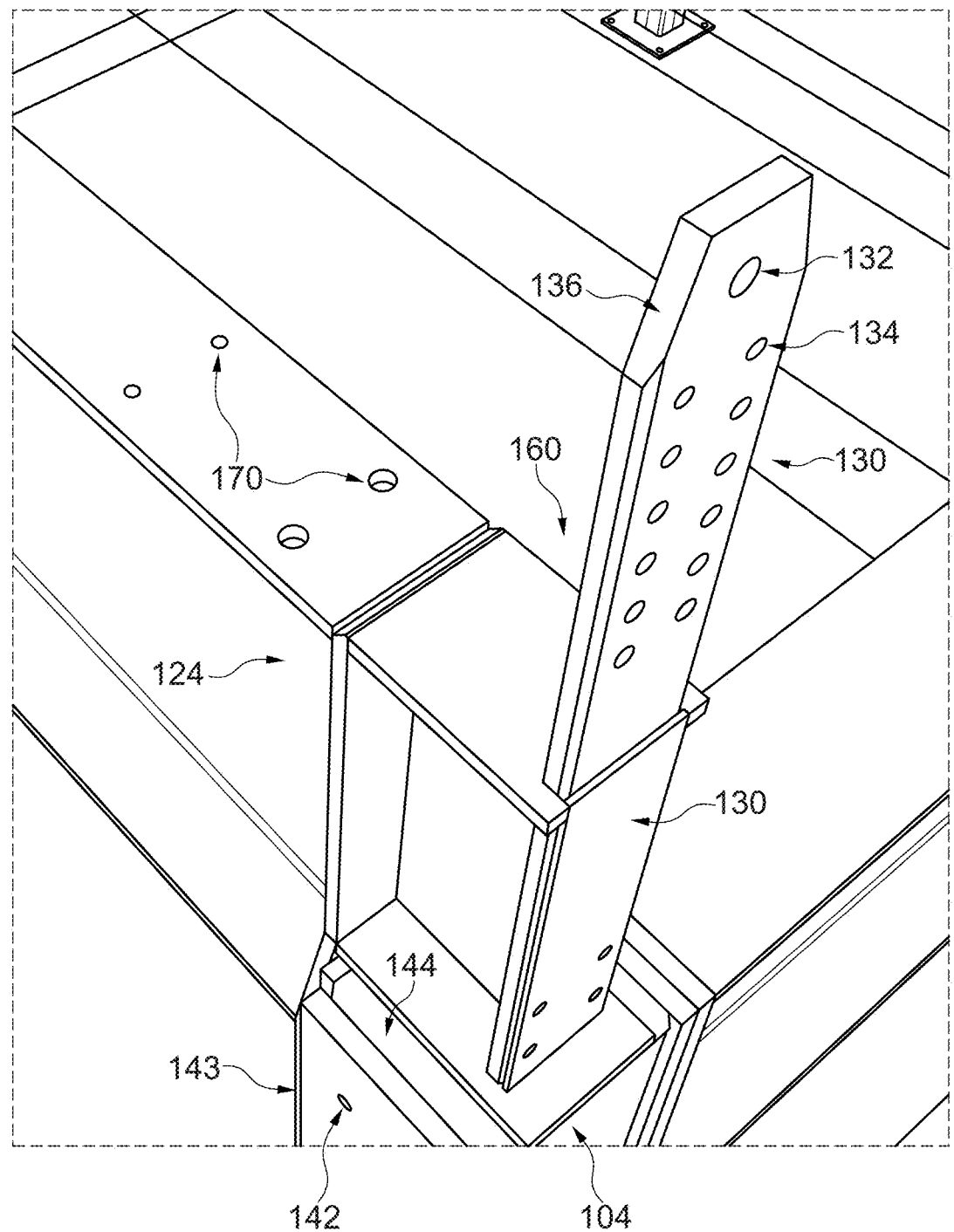
FIG. 10 is an additional detail view of a utility wall distal end of a podium level steel transfer structure, in accordance with some implementations.

As noted above, each transverse member 108 includes both an exterior wall distal end 122 and a utility wall distal end 124. FIG. 7 is an axonometric view of the utility wall distal end 124 of the podium level steel transfer structure 100, FIG. 9 is a detail view of the utility wall distal end 124 of the podium level steel transfer structure 100, and, FIG. 10 is an additional detail view of the utility wall distal end 124 of the podium level steel transfer structure 100, in accordance with some implementations.

As shown, the utility wall distal end 124 includes an end plate 162 welded thereon, an oblique support member 166 welded thereon, and an end cap 160 welded to the end plate 162. Furthermore, the transverse member 108 may be formed from an I-beam, wide flange, HSS, other structural member, and/or two or more channels of steel welded together. Additionally, the transverse member 108 may include a plurality of fastening holes 170 formed on an upper surface for attaching floor/ceiling panels or other panels directly thereto.

The end cap 160 may include an end plate 136/137 formed from the engagement feature 130 and welded thereon. The engagement feature 130 may include two or more notches 136 formed at a distal, upper end configured to receive, align, and retain both an interior wall and an exterior wall during building construction. Hereinafter, a more detailed discussion of the construction of different levels (e.g., level L2) of building 10 is presented with reference to FIGS. 11-17.

Figure 11:
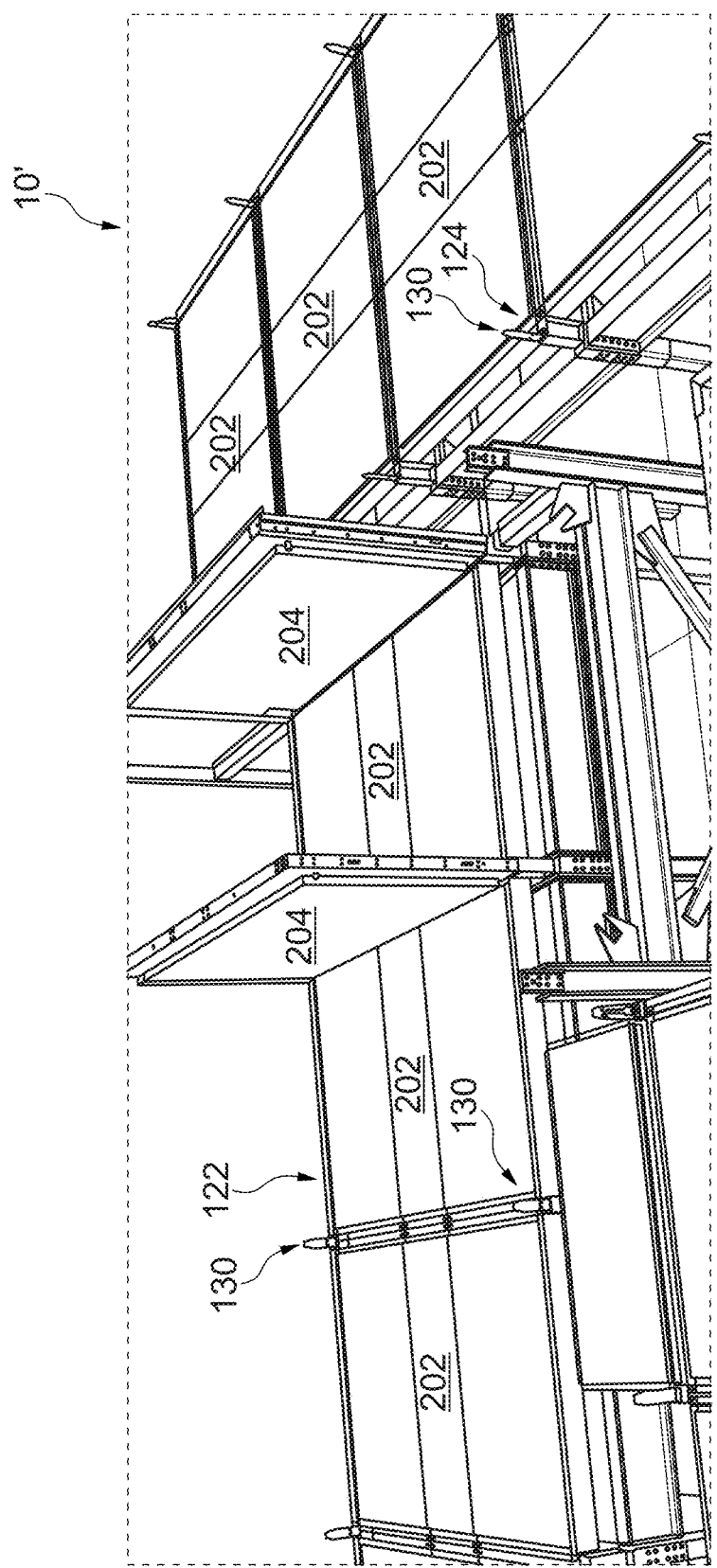
FIG. 11 is an axonometric view of a podium level steel transfer structure having floor panels and interior demising walls engaged therewith, in accordance with some implementations.

FIG. 11 is an axonometric view of the podium level steel transfer structure 100 having floor panels 202 and interior demising/end walls 204 engaged therewith, in accordance with some implementations. As shown, floor panels 202 (also referred to as floor-ceiling panels herein) are arranged on and between transverse members 108 such that engagement features 130 extend vertically. Each engagement feature 130 is orthogonal to the plane formed by the floor panel 202. After installation of the floor panels 202, interior, exterior, and/or utility walls may be installed.

For example, interior demising walls 204 may be installed. Each interior demising wall 204 is orthogonal to an associated floor panel 202. Each interior demising wall 204 may include engagement features (170, illustrated in FIG. 13) corresponding to engagement features 130. Therefore, upon arrangement of an interior demising wall onto the podium level steel transfer structure 100, the interior demising wall 204 is held vertically such that fasteners may be driven to join the interior demising wall to the engagement feature 130 and captive fasteners 134 disposed thereon.

Figure 12:
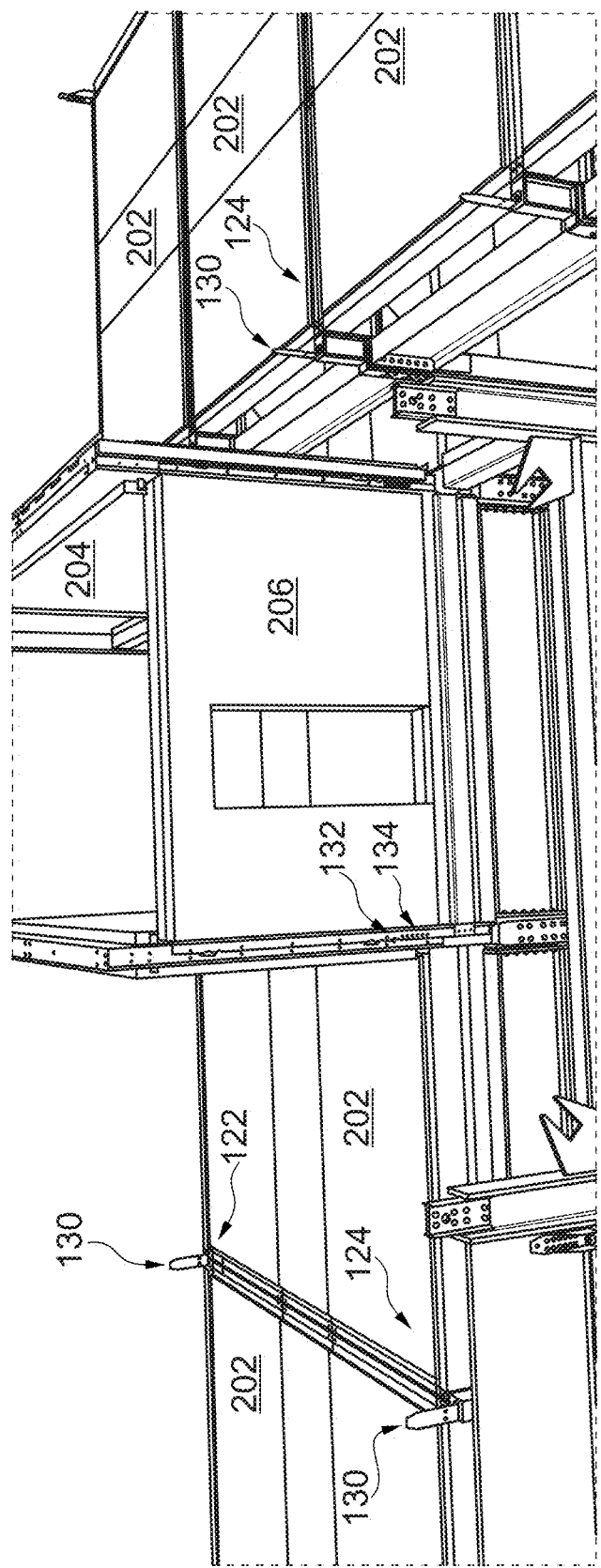
FIG. 12 is an alternate axonometric view of a podium level steel transfer structure having floor panels and interior demising walls engaged therewith, in accordance with some implementations.

FIG. 12 is an alternate axonometric view of the podium level steel transfer structure 100 having floor panels 202 and interior demising/end walls 204 engaged therewith, in accordance with some implementations. The utility walls 206 are hung from the demising walls 204 and end walls. As shown, utility walls, exterior walls, and/or other dividing panels 206 may be arranged between associated interior demising walls 204. Each utility wall and/or exterior wall 206 may include through holes arranged to be disposed within fastening range of associated captive fasteners of the engagement features 130. So, for example, as two interior walls are arranged onto associated sections of installed floor panels 202, a utility wall, exterior wall, or another vertical panel 206 may also be arranged thereon, to create a three-walled structure. Through an exteriorly visible alignment hole 132, a tapered rod may be inserted such that an interior demising wall 204 and proximal utility wall 206 are driven into alignment, and fasteners may be driven into fastening relation with the captive fasteners 134.

Figure 13:
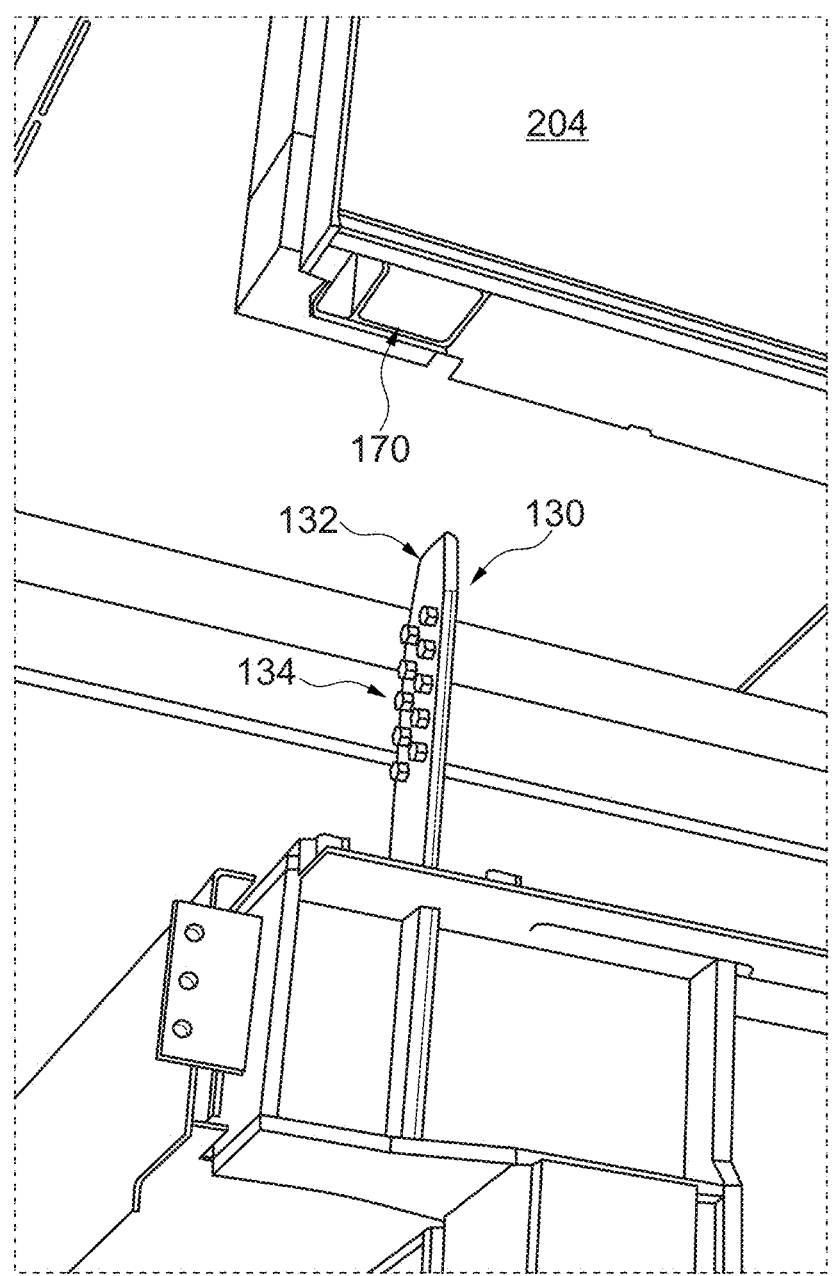
FIG. 13 is a detail view of an interior demising wall engagement feature and a podium level steel transfer structure engagement feature, in accordance with some implementations.
Figure 14:
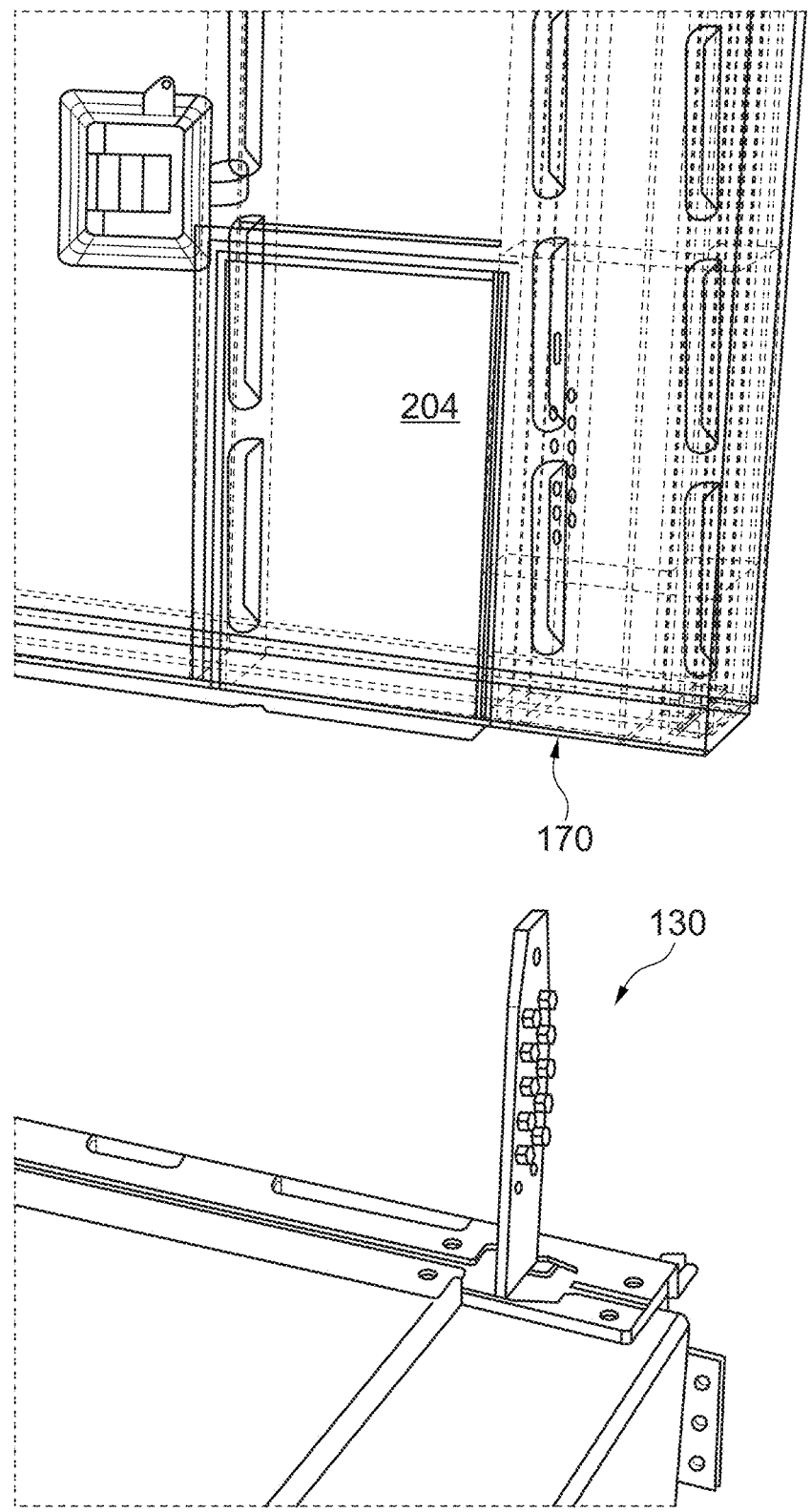
FIG. 14 is an additional detail view of an interior demising wall engagement feature and a podium level steel transfer structure engagement feature, in accordance with some implementations.

For example, FIG. 13 is a detail view of an interior demising wall engagement feature 170 and a podium level steel transfer structure engagement feature 130, and, FIG. 14 is an additional detail view, in accordance with some implementations. As shown, as the demising wall 204 is lowered onto the engagement feature 130, the feature 170 slips about the feature 130, and oblique notches of the feature 130 automatically align the feature 170. In this manner, the feature 170 encompasses the feature 130 during installation. Furthermore, feature 170 includes through holes formed there-through that are in rough alignment with the captive fasteners 134 as well as the alignment hole 132. Therefore, when a tapered rod is forced into the alignment hole 132, interior sides of the feature 170 end exterior edges of the feature 130 slideably engage to align and retain the interior demising wall 204 in the vertical position. This engagement is illustrated more fully with reference to FIGS. 15A and 15B.

Figure 15A:
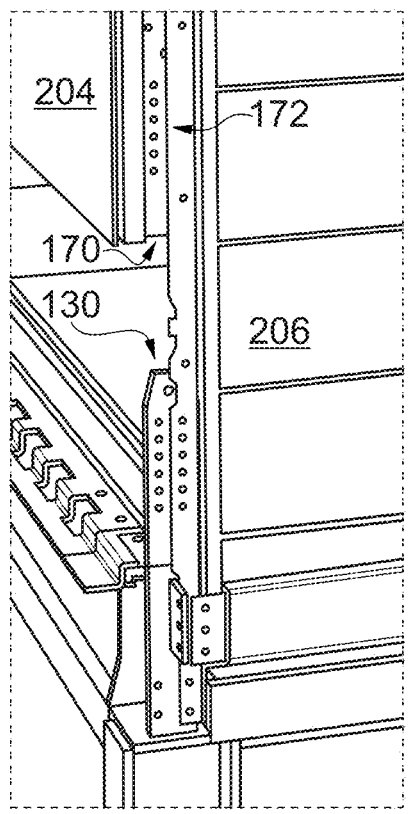
FIGS. 15A and 15B illustrate engagement between an interior demising wall, a utility wall or an exterior wall, and a podium level steel transfer structure, in accordance with some implementations.
Figure 15B:
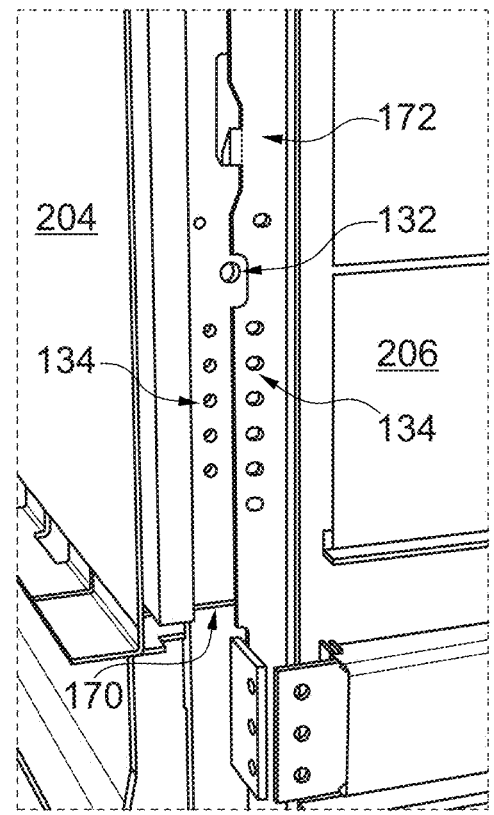

FIGS. 15A and 15B illustrate engagement between an interior demising wall, a utility wall or an exterior wall, and the podium level steel transfer structure 100, in accordance with some implementations. As shown, as the demising wall 204 is lowered onto the engagement feature 130, and as utility wall 206 is lowered onto the engagement feature 130 (e.g., after arranging wall 204), the feature 170 slips about the feature 130, and feature 172 slides onto a face of the feature 170. In this manner, the feature 170 encompasses the feature 130 during installation while the feature 172 rests against the feature 170. Therefore, when a tapered rod is forced into the alignment hole 132, interior sides of the feature 170 end exterior edges of the feature 130 slideably engage to align and retain the interior demising wall 204 and the utility wall 206 in the vertical position.

Figure 16:
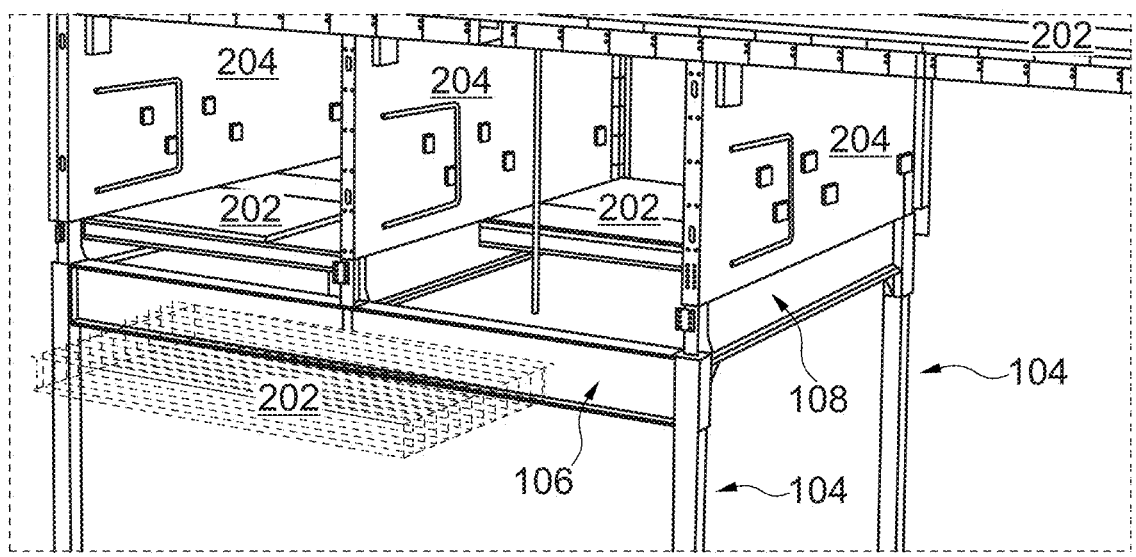
FIG. 16 is an axonometric view of a partially constructed building having a podium level steel transfer structure, in accordance with some implementations.
Figure 17:
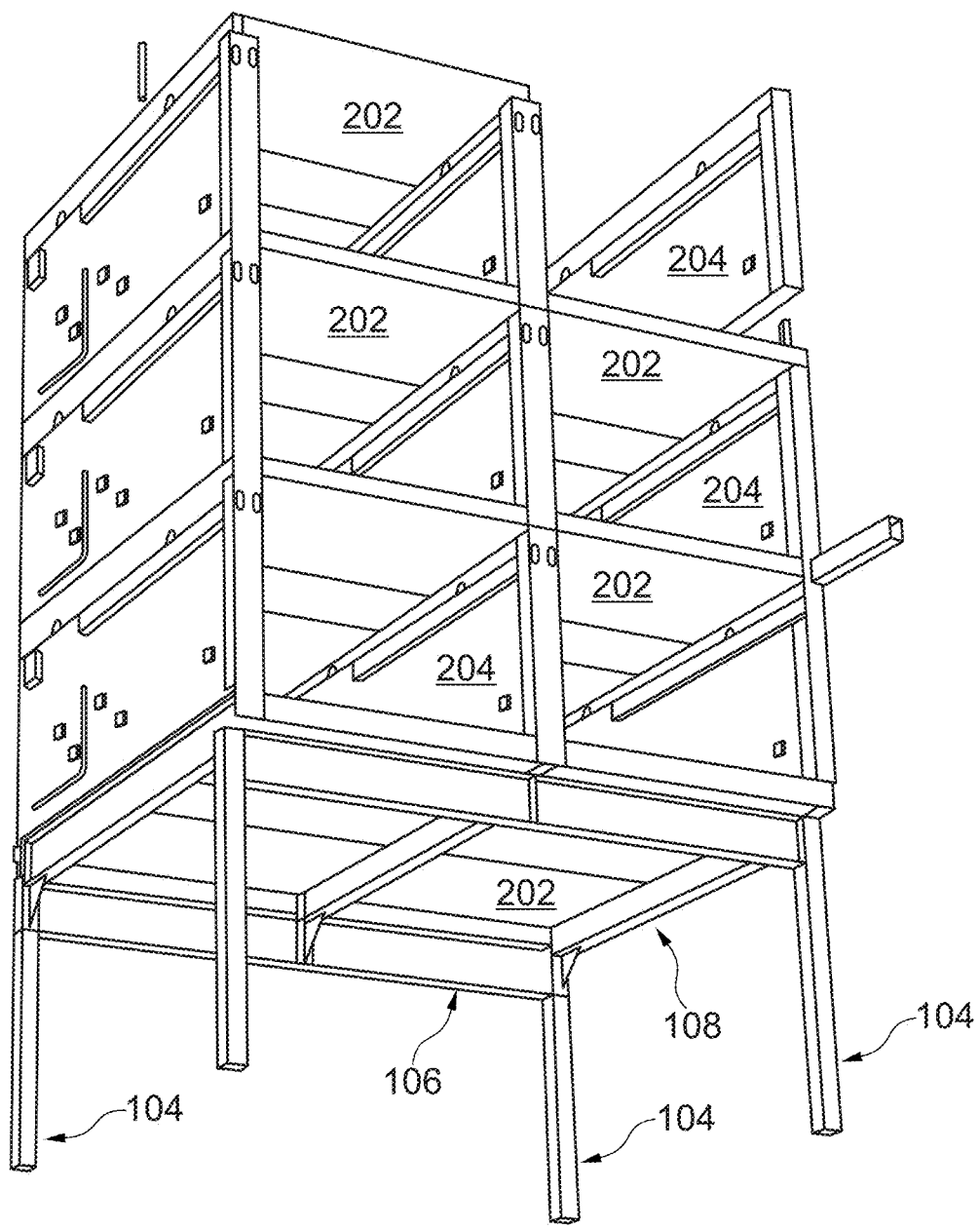
FIG. 17 is an alternate axonometric view of a partially constructed building having a podium level steel transfer structure, in accordance with some implementations.

Upon application of fasteners into the associated captive fasteners 134, installation of the associated panels 202, 204, and 206 is complete, and a space lacking a ceiling is formed. Thereafter, additional floor panels 202 may be installed onto the upper portions of the panels 204, to form both of the ceiling for the prior level, and the floor for the subsequent level. For example, FIGS. 16 and 17 illustrate a completed installation of a first level and subsequent levels. In the iterative manner shown in FIGS. 16 and 17, a relatively simple construction of a low to mid-rise building may be accomplished through use of a podium level steel transfer structure. It is noted that a single floor panel 202 is shown "floating" in FIG. 16 to better illustrated an interior of the building; however, it should be understood that all floor panels 202 should be installed prior to installation of panels 204. The podium level steel transfer structure may replace conventional construction techniques such as pre-formed hollow podium concrete slabs, post-fixed steel scaffold/structure with concrete slabs, and many other conventional techniques.

As described in detail above, a building includes a podium level steel transfer structure configured to receive vertical loads and lateral loads from upper portions of the building. The building may be a low-rise building or a mid-rise building. The podium level steel transfer structure may be at least partially pre-constructed such that final assembly may occur at a job site with reduced skilled labor. Transverse members of the podium level steel transfer structure may include engagement features extending vertically therefrom, and configured to align, engage, and retain at least one interior demising wall and at least one exterior wall in an orthogonal relationship through multiple fasteners. The engagement features may include a steel member with a trapezoidal profile having one or more angular notches, one or more captive fasteners, and at least one alignment hole. The engagement features are dimensioned to engage within a hollow-steel structural member of an interior demising wall. The hollow-steel structural member further includes through holes configured to be aligned with associated captive fasteners of the engagement features and to receive fasteners therein. Exterior walls such as, for example, utility wall panels may also include through holes on at least one edge configured to further engage with the captive fasteners of the engagement features of the steel transfer structure. Therefore, upon partial assembly, each engagement feature of the steel transfer structure aligns, engages, and retains both an interior wall and an exterior wall.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A podium level steel transfer structure for a building, the podium level steel transfer structure comprising:
   a vertical member configured to extend vertically from a ground plane, the vertical member being substantially rectangular in cross section, the vertical member having a first end configured to be joined to a foundation located on the ground plane and a second end configured to receive and transfer loads and forces of the building to the foundation;
   a longitudinal member configured to extend orthogonal to the vertical member and parallel to the ground plane, the longitudinal member having two end plates arranged on respective ends of the longitudinal member, each of the two end plates being configured to join at the second end of the vertical member; and
   a transverse member configured to extend orthogonal to the vertical member, orthogonal to the longitudinal member, and parallel to the ground plane, the transverse member comprising a first distal end having a first engagement feature configured to align, engage, and retain an interior load-bearing wall panel, the first distal end configured to rest upon the second end of the vertical member, the transverse member further comprising a second distal end having a second engagement feature configured to align, engage, and retain the interior load-bearing wall panel, the second distal end configured to rest upon the second end of the vertical member,
   wherein the second end of the vertical member comprises at least three end plates welded thereon, and wherein each end plate of the at least three end plates comprises one or more captive fasteners welded thereto configured to receive and retain fasteners engaged with one or more of the longitudinal member or the transverse member.

2. The podium level steel transfer structure of claim 1, wherein the vertical member, longitudinal member, and transverse member are formed from metal.

3. The podium level steel transfer structure of claim 1, wherein each end plate of the at least three end plates is configured to receive and retain fasteners inserted through respective end plates of the longitudinal member and the transverse member.

4. The podium level steel transfer structure of claim 1, wherein the second end of the vertical member comprises an end plate welded thereon and configured to support the first distal end or the second distal end of the transverse member.

5. The podium level steel transfer structure of claim 1, wherein the vertical member is formed from structural steel having a rectangular cross section, and wherein a thickness of sides of the rectangular cross section are dimensioned to receive and support transferred loads from upper levels of the building.

6. The podium level steel transfer structure of claim 1, wherein the longitudinal member is formed from a steel I-beam or two or more steel channels welded to one another.

7. The podium level steel transfer structure of claim 1, wherein each of the two end plates of the longitudinal member are welded onto respective ends of the longitudinal member.

8. The podium level steel transfer structure of claim 1, wherein the transverse member is formed from a steel I-beam or two or more steel channels welded to one another.

9. The podium level steel transfer structure of claim 1, wherein the longitudinal member further comprises a central portion arranged to support and engage with both of the first distal end and the second distal end of the transverse member.

10. The podium level steel transfer structure of claim 1, wherein the first distal end of the transverse member comprises an end cap extending along an axis defined by the transverse member and configured to rest on top of the second end of the vertical member, wherein the first distal end further comprises an end plate welded between the end cap and a main body of the transverse member, and wherein the end plate comprises one or more through holes configured to receive fasteners that engage with the second end of the vertical member.

11. The podium level steel transfer structure of claim 10, wherein the first engagement feature extends into the end cap and is welded onto and within the end cap.

12. The podium level steel transfer structure of claim 11, wherein the first engagement feature comprises at least one oblique notch configured to engage with the interior load-bearing wall panel.

13. The podium level steel transfer structure of claim 1, wherein the second distal end of the transverse member comprises an end cap extending along an axis defined by the transverse member and configured to rest on top of the second end of the vertical member, wherein the second distal end further comprises an end plate welded between the end cap and a main body of the transverse member, and wherein the end plate comprises one or more through holes configured to receive fasteners that engage with the second end of the vertical member.

14. The podium level steel transfer structure of claim 13, wherein the second engagement feature extends across the end cap and is welded onto the end cap to form another end plate.

15. The podium level steel transfer structure of claim 14, wherein the second engagement feature comprises at least one oblique notch configured to engage with the interior load-bearing wall panel.

16. A building, comprising:
one or more levels formed from prefabricated interior and exterior panels and substantially parallel to a ground plane defined by a foundation; and
a podium level steel transfer structure arranged to receive and support loads from the one or more levels and transfer the loads to the foundation, the podium level steel transfer structure comprising:
a vertical member being substantially rectangular in cross section and extending vertically from the ground plane, the vertical member having a first end configured to be joined to the foundation and a second end configured to receive and transfer the loads;
a longitudinal member extending orthogonal to the vertical member and parallel to the ground plane, the longitudinal member having two end plates arranged on respective ends of the longitudinal member, at least one of the two end plates being joined at the second end of the vertical member; and
a transverse member extending orthogonal to the vertical member, orthogonal to the longitudinal member, and parallel to the ground plane, the transverse member comprising a first distal end having a first engagement feature configured to align, engage, and retain an interior load-bearing wall panel of at least one of the one or more levels, the first distal end configured to rest upon the second end of the vertical member, the transverse member further comprising a second distal end having a second engagement feature configured to align, engage, and retain the interior load-bearing wall panel, the second distal end configured to rest upon the second end of the vertical member,
wherein the second end of the vertical member comprises at least three end plates welded thereon, and wherein each end plate of the at least three end plates comprises one or more captive fasteners welded thereto configured to receive and retain fasteners engaged with one or more of the longitudinal member or the transverse member.

17. The building of claim 16, wherein each end plate of the at least three end plates is configured to receive and retain fasteners inserted through respective end plates of the longitudinal member and the transverse member.

18. The building of claim 16, wherein the longitudinal member is formed from a steel I-beam or two or more steel channels welded to one another, and wherein each of the two end plates of the longitudinal member are welded onto respective ends of the longitudinal member.

19. The building of claim 16, wherein:
the first distal end of the transverse member comprises an end cap extending along an axis defined by the transverse member and configured to rest on top of the second end of the vertical member, wherein the first distal end further comprises an end plate welded between the end cap and a main body of the transverse member, and wherein the end plate comprises one or more through holes configured to receive fasteners that engage with the second end of the vertical member;
the second distal end of the transverse member comprises an end cap extending along an axis defined by the transverse member and configured to rest on top of the second end of the vertical member, wherein the second distal end further comprises an end plate welded between the end cap and a main body of the transverse member, and wherein the end plate comprises one or more through holes configured to receive fasteners that engage with the second end of the vertical member;
the first engagement feature extends into the end cap and is welded onto and within the end cap; and
the second engagement feature extends across the end cap and is welded onto the end cap to form another end plate.

* * * * *